United States Patent [19]

Shaw

[11] 4,341,080

[45] Jul. 27, 1982

[54] METHOD FOR REFRIGERATION

[75] Inventor: Robert G. Shaw, Drummoyne, Australia

[73] Assignee: The Commonwealth Industrial Gases Limited, New South Wales, Australia

[21] Appl. No.: 265,937

[22] Filed: May 21, 1981

Related U.S. Application Data

[62] Division of Ser. No. 121,199, Feb. 13, 1980, Pat. No. 4,307,580.

[30] Foreign Application Priority Data

Feb. 20, 1979 [AU] Australia .............................. PD7749

[51] Int. Cl.³ .............................................. F25D 17/02
[52] U.S. Cl. ........................................... 62/64; 62/99
[58] Field of Search ..................... 62/64, 63, 374, 375, 62/406, 430, 99

[56] References Cited

U.S. PATENT DOCUMENTS

| 3,371,504 | 3/1968 | Brindley | 62/406 |
|---|---|---|---|
| 3,492,831 | 2/1970 | Mauer et al. | 62/62 |
| 3,906,742 | 9/1975 | Newton | 62/332 |
| 4,237,695 | 12/1980 | Oberpriller et al. | 62/332 |

Primary Examiner—Ronald C. Capossela
Attorney, Agent, or Firm—Beveridge, DeGrandi & Kline

[57] ABSTRACT

Apparatus is disclosed for refrigerating a moist article, the apparatus comprising a cold room, means for circulating cooling atmosphere through the cold room, a moisture absorbent liquid cooling spray in the path of said atmosphere, means for collecting and recirculating the liquid in a continuous path, means for admitting a cryogenic cooling fluid to the liquid and means for removing the fluid and absorbed moisture from the liquid before the liquid returns to the spray.

4 Claims, 3 Drawing Figures

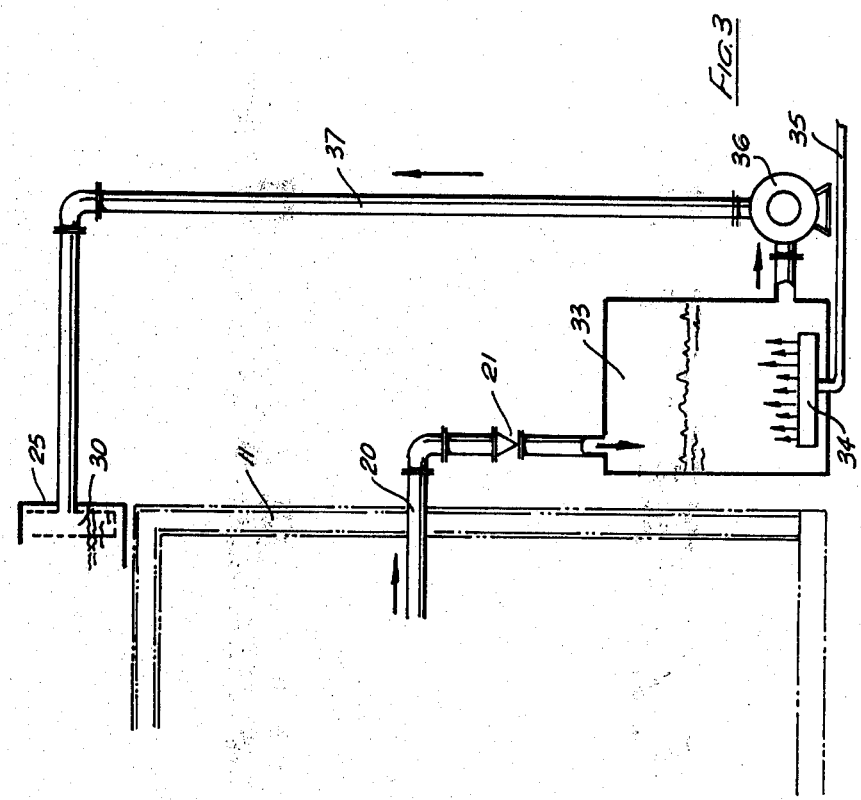

METHOD FOR REFRIGERATION

REFERENCE TO A RELATED APPLICATION

The present application is a divisional application based on my copending application Ser. No. 121,199 filed Feb. 13, 1980, which is now U.S. Pat. No. 4,307,580.

This invention relates to reducing the temperature of articles particularly foodstuffs for short or long term storage.

The introduction of cryogenic fluids such as liquid nitrogen into mechanical air blast freezer rooms improves their performance dramatically. There are believed to be two main inter-related benefits. The first is a very rapid removal of heat during the first hour of freezing, which is beyond the normally designed capabilities of mechanical freezing, and brings the temperature of the skin of the product rapidly to freezing point and hence seals in moisture.

The second benefit is associated with the dry atmosphere caused by the injection of liquid nitrogen. Moisture coming out of the product being frozen is rapidly purged out of the room by the large volume of nitrogen gas generated which is continually exhausted from the room. Thus the moisture lost from the product cannot freeze-out and collect on the coils of the mechanical refrigerating units through which a liquid refrigerant circulates to cool the air blast. Normally this freezing-out is significant and blinds the coils thereby reducing the efficiency of the units and slows down the freezing of the product because of the extra temperature differential across the ice which severely limits the capacity of the refrigeration equipment by reducing evaporator temperatures.

One means of achieving an improvement in air blast freezer rooms by the introduction into the room of a cryogenic fluid such as liquid nitrogen. However, a very significant disadvantage of such liquid nitrogen boosting is that the freezer room atmosphere is unfavourable to human life. Since the product is usually loaded by hand on overhead rails, or by fork lift, the room must be equipped with fairly elaborate safety controls to prevent suffocation of loading and unloading staff.

It is an object of the present invention to provide means for refrigerating a moist article whereby a nontoxic cooling atmosphere can be employed and where means are provided for removing moisture from the atmosphere.

According to the invention there is provided apparatus for refrigerating a moist article comprising a cold room, means for circulating cooling atmosphere through said cold room, a moisture absorbent liquid cooling spray in the path of said atmosphere, means for collecting and recirculating said liquid in a continuous path, means for admitting a cryogenic cooling fluid to said liquid and means for removing said fluid and absorbed moisture from said liquid before said liquid returns to said spray.

The invention also provides a method of refrigerating a moist article comprising the steps of circulating a cooling atmosphere past said article, cooling said atmosphere by contact with a moisture absorbent liquid spray, collecting and recirculating said liquid, cooling said liquid by bringing it into contact with a cryogenic fluid and removing said fluid and any absorbed moisture from said liquid before returning said liquid to said article.

Preferred embodiments of the invention will now be described, by way of example only, with reference to the accompanying drawings in which:

FIG. 3 is a sectional side elevation showing a modification to the embodiment of FIG. 1.

Figure 1:
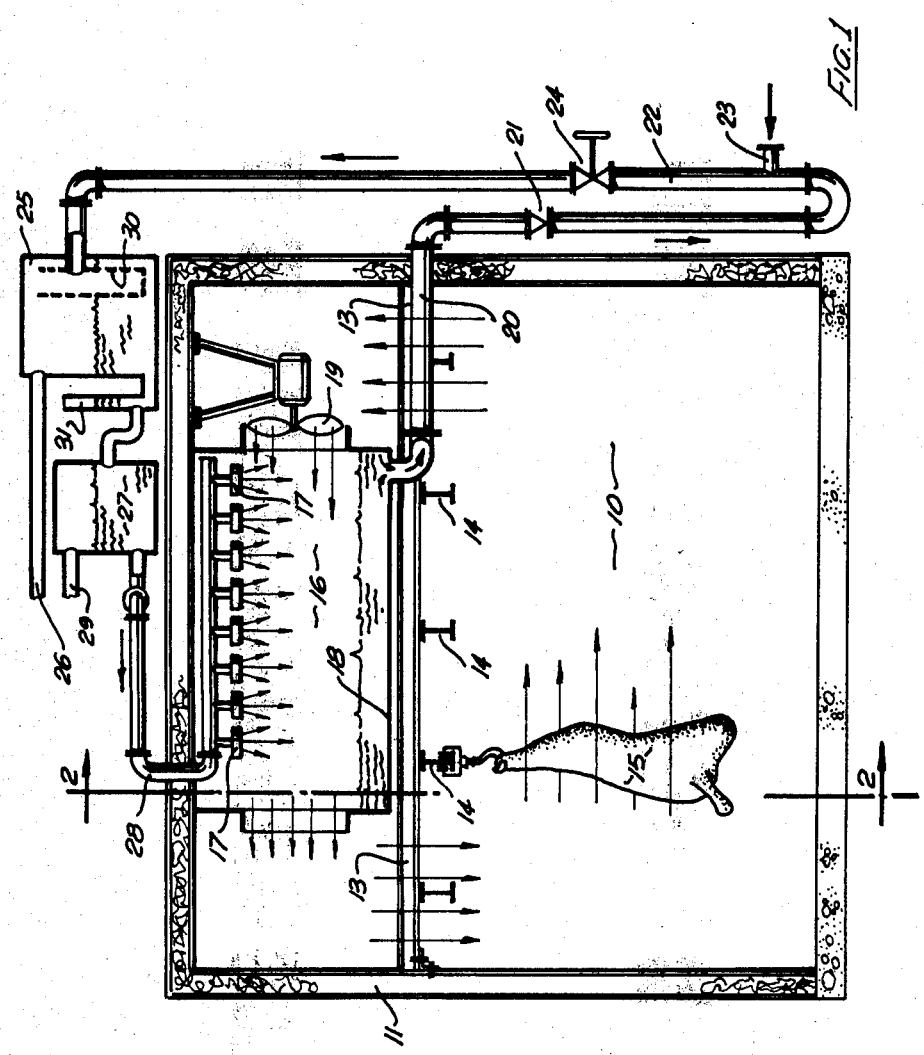
FIG. 1 is a sectional side elevation of refrigeration apparatus according to the invention.
Figure 2:
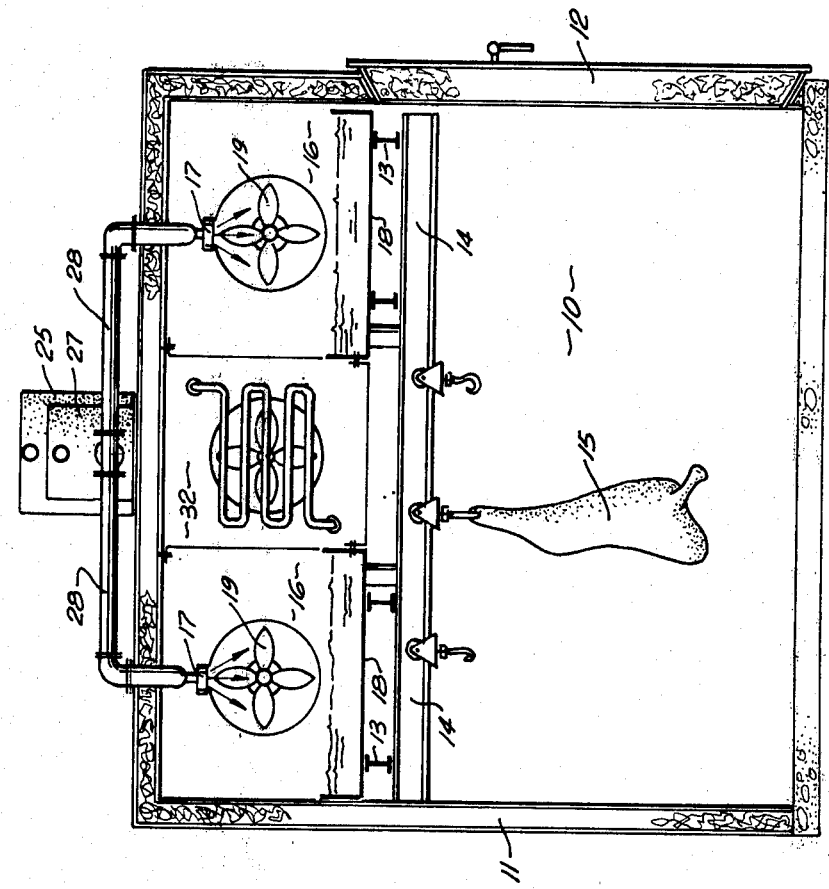
FIG. 2 is a view taken on line 2—2 of FIG. 1.

Referring initially to FIGS. 1 and 2 of the drawings, a cold room shown generally by numeral 10 is enclosed by heat insulating walls 11 and sealed by an access door 12. Located within the room is a frame 13 supporting rails 14 from which are suspended the articles to be frozen 15. The frame 13 also supports a pair of contact air coolers 16 within the cold room 10.

Each cooler 16 is provided with a plurality of downwardly directed spray nozzles 17 for spraying a cooling liquid into a trough 18 located directly beneath them. A fan 19 associated with each cooler circulates cooling air through the open ended cooler and then down through the cold room, past the articles to be frozen and back to the cooler.

The cooling liquid is preferably a brine solution including calcium chloride and propylene glycol but it will be appreciated that any suitable liquid may be used. Liquid collected in the trough passes down through conduit 20 through a non-return valve 21 to a gas-lift pipe 22 having an inlet port 23 through which a cryogenic fluid is admitted. The cryogenic fluid is preferably liquid nitrogen but again, any suitable fluid may be used.

Upon admission to the pipe 23 the fluid cools the circulating liquid and boils, rising in the pipe and carrying the liquid with it through a throttle valve 24 and into a separator tank 25. The cryogenic gas then escapes to atmosphere through vent 26 while the liquid passes into a brine concentrator 27 prior to returning to the spray nozzles 17 through gallery pipe 28. The concentrator monitors and adjusts the specific gravity of the brine by known means, admitting additional brine concentrate as required through port 29.

Moisture evaporating from the articles within the cold rooms is absorbed as a liquid by the brine spray as the cooling atmosphere traverses the cooler. Once in contact with the cryogenic fluid, however, the moisture freezes out as ice particles which are strained out of the brine by a removable filter 30 located within the separator tank 25. Some of the moisture may be carried out through vent 26 with the cryogenic gas.

Known temperature and liquid level sensors are preferably located within the separator tank to control the admission of cryogenic fluid through inlet port 23 and the rate of flow through throttle valve 24 respectively. An intermediate pipe 31 is preferably provided to act as a syphon breaker.

Preferably, the cold room also includes a conventional forced draught cooler unit 32, located between the spray coolers 16.

In another embodiment as shown in FIG. 3, the gas-lift system is replaced with a pump. In this arrangement, brine from the coolers 16 is directed by gravity feed through pipe 20 to a holding tank 33. A gas sparging head 34 is located in the lower portion of the tank to receive liquid nitrogen from pipe 35. A pump 36 receives brine cooled by the liquid nitrogen and pumps it to the separator tank 25 through pipe 37. The speed of the pump is preferably controlled in known manner by a liquid level sensor in the separator tank.

Although the invention has been described with reference to specific examples, it will be appreciated by those skilled in the art that the invention may be embodied in many other forms.

I claim:

1. A method of refrigerating a moist article comprising the steps of circulating a cooling atmosphere past said article, cooling said atmosphere by contact with a moisture absorbent liquid spray, collecting and recirculating said liquid, cooling said liquid by bringing it into contact with a cryogenic fluid and removing said fluid and any absorbed moisture from said liquid before returning said liquid to said spray.

2. A method of refrigerating a moist article as set forth in claim 1 wherein said atmosphere is treated by spraying a moisture absorbent liquid cooling spray into the path of said atmosphere and wherein the liquid is then collected and recirculated for spraying into the atmosphere.

3. The method of refrigerating as set forth in claim 1, wherein the moist article is a foodstuff.

4. The method of refrigerating as set forth in claim 1, wherein said liquid is a brine solution.

* * * * *